US011970664B2

(12) United States Patent
Larsen et al.

(10) Patent No.: US 11,970,664 B2
(45) Date of Patent: *Apr. 30, 2024

(54) METHODS AND SYSTEMS FOR ENHANCING PROCESSING OF HYDROCARBONS IN A FLUID CATALYTIC CRACKING UNIT USING A RENEWABLE ADDITIVE

(71) Applicant: MARATHON PETROLEUM COMPANY LP, Findlay, OH (US)

(72) Inventors: Nikolas A. Larsen, Findlay, OH (US); Jeffrey A. Sexton, Findlay, OH (US); Ray Brooks, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/144,298

(22) Filed: May 8, 2023

(65) Prior Publication Data
US 2023/0272290 A1 Aug. 31, 2023

Related U.S. Application Data

(63) Continuation of application No. 18/045,314, filed on Oct. 10, 2022, now Pat. No. 11,692,141.

(Continued)

(51) Int. Cl.
*C10G 11/18* (2006.01)
*B01J 8/18* (2006.01)
(Continued)

(52) U.S. Cl.
CPC ........... *C10G 11/182* (2013.01); *B01J 8/1809* (2013.01); *B01J 8/1836* (2013.01); *B01J 8/24* (2013.01);
(Continued)

(58) Field of Classification Search
CPC ............... C10G 11/182; C10G 11/187; C10G 2300/1011; C10G 2300/202;
(Continued)

(56) References Cited

U.S. PATENT DOCUMENTS

| 981,434 A | 1/1911 | Lander |
|---|---|---|
| 1,526,301 A | 2/1925 | Stevens |

(Continued)

FOREIGN PATENT DOCUMENTS

| AT | 11772 U1 | 4/2011 |
|---|---|---|
| BR | PI0701518 | 11/2008 |

(Continued)

OTHER PUBLICATIONS

Lerh et al., Feature: IMO 2020 draws more participants into Singapore's bunkering pool., S&P Global Platts, www.spglobal.com, Sep. 3, 2019.

(Continued)

*Primary Examiner* — Brian A McCaig
(74) *Attorney, Agent, or Firm* — Womble Bond Dickinson (US) LLP

(57) ABSTRACT

Systems and methods for enhancing the processing of hydrocarbons in a FCC unit by introduction of the coked FCC catalyst from the FCC reactor and a renewable feedstock to the FCC regenerator to facilitate regeneration of the coked FCC catalyst. The renewable feedstock can contain biomass-derived pyrolysis oil. The biomass-derived pyrolysis oil and coke from the coked FCC catalyst are oxidized by oxygen to provide a regenerated catalyst that is recycled to the FCC reactor.

29 Claims, 5 Drawing Sheets

Related U.S. Application Data

(60) Provisional application No. 63/262,342, filed on Oct. 10, 2021.

(51) Int. Cl.
*B01J 8/24* (2006.01)
*B01J 38/02* (2006.01)

(52) U.S. Cl.
CPC .............. *B01J 38/02* (2013.01); *C10G 11/187* (2013.01); *B01J 2208/00017* (2013.01); *C10G 2300/1011* (2013.01); *C10G 2300/202* (2013.01); *C10G 2300/4006* (2013.01); *C10G 2300/4081* (2013.01); *C10G 2300/708* (2013.01)

(58) Field of Classification Search
CPC .... C10G 2300/4006; C10G 2300/4081; C10G 2300/708; B01J 8/1809; B01J 8/1836; B01J 8/24; B01J 38/02; B01J 2208/00017
See application file for complete search history.

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |

(56) References Cited

U.S. PATENT DOCUMENTS

| | | |
|---|---|---|
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,102,655 A | 8/2000 | Kreitmeier |
| 6,105,441 A | 8/2000 | Conner et al. |

(56) References Cited

U.S. PATENT DOCUMENTS

| | | |
|---|---|---|
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |

(56) References Cited

U.S. PATENT DOCUMENTS

| | | |
|---|---|---|
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 10,047,299 B2 | 8/2018 | Rubin-Pitel et al. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davydov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0150820 A1 | 7/2005 | Guo |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |

(56) References Cited

U.S. PATENT DOCUMENTS

| | | |
|---|---|---|
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0225897 A1 | 8/2013 | Candelon et al. |
| 2013/0288355 A1 | 10/2013 | DeWitte et al. |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0199462 A1 | 6/2020 | Klussman et al. |
| 2020/0208068 A1 | 7/2020 | Hossain et al. |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |

(56) References Cited

U.S. PATENT DOCUMENTS

| | | | |
|---|---|---|---|
| 2023/0220286 A1 | 7/2023 | Cantley et al. | |
| 2023/0241548 A1 | 8/2023 | Holland et al. | |
| 2023/0242837 A1 | 8/2023 | Short et al. | |

FOREIGN PATENT DOCUMENTS

| | | | |
|---|---|---|---|
| CA | 2949201 | 11/2015 | |
| CA | 2822742 | 12/2016 | |
| CA | 3009808 | 7/2017 | |
| CA | 2904903 | 8/2020 | |
| CA | 3077045 | 9/2020 | |
| CA | 2947431 | 3/2021 | |
| CA | 3004712 | 6/2021 | |
| CA | 2980055 | 12/2021 | |
| CA | 2879783 | 1/2022 | |
| CA | 2991614 | 1/2022 | |
| CA | 2980069 | 11/2022 | |
| CA | 3109606 | 12/2022 | |
| CH | 432129 | 3/1967 | |
| CN | 2128346 | 3/1993 | |
| CN | 201306736 | 9/2009 | |
| CN | 201940168 | 8/2011 | |
| CN | 102120138 | 12/2012 | |
| CN | 203453713 | 2/2014 | |
| CN | 203629938 | 6/2014 | |
| CN | 203816490 | 9/2014 | |
| CN | 104353357 | 2/2015 | |
| CN | 204170623 | 2/2015 | |
| CN | 103331093 | 4/2015 | |
| CN | 204253221 | 4/2015 | |
| CN | 204265565 | 4/2015 | |
| CN | 105148728 | 12/2015 | |
| CN | 204824775 | 12/2015 | |
| CN | 103933845 | 1/2016 | |
| CN | 105289241 | 2/2016 | |
| CN | 105536486 | 5/2016 | |
| CN | 105804900 | 7/2016 | |
| CN | 103573430 | 8/2016 | |
| CN | 205655095 | 10/2016 | |
| CN | 104326604 | 11/2016 | |
| CN | 104358627 | 11/2016 | |
| CN | 106237802 | 12/2016 | |
| CN | 205779365 | 12/2016 | |
| CN | 106407648 | 2/2017 | |
| CN | 105778987 | 8/2017 | |
| CN | 207179722 | 4/2018 | |
| CN | 207395575 | 5/2018 | |
| CN | 108179022 | 6/2018 | |
| CN | 108704478 | 10/2018 | |
| CN | 109126458 | 1/2019 | |
| CN | 109423345 | 3/2019 | |
| CN | 109499365 | 3/2019 | |
| CN | 109705939 | 5/2019 | |
| CN | 109722303 | 5/2019 | |
| CN | 110129103 | 8/2019 | |
| CN | 110229686 | 9/2019 | |
| CN | 209451617 | 10/2019 | |
| CN | 110987862 | 4/2020 | |
| CN | 215288592 | 12/2021 | |
| CN | 113963818 | 1/2022 | |
| CN | 114001278 | 2/2022 | |
| CN | 217431673 | 9/2022 | |
| CN | 218565442 | 3/2023 | |
| DE | 10179 | 6/1912 | |
| DE | 3721725 | 1/1989 | |
| DE | 19619722 | 11/1997 | |
| DE | 102010017563 | 12/2011 | |
| DE | 102014009231 A1 | 1/2016 | |
| EP | 0142352 | 5/1985 | |
| EP | 0527000 | 2/1993 | |
| EP | 0783910 A1 | 7/1997 | |
| EP | 0949318 | 10/1999 | |
| EP | 0783910 B1 | 12/2000 | |
| EP | 0801299 | 3/2004 | |
| EP | 1413712 | 4/2004 | |
| EP | 1600491 | 11/2005 | |
| EP | 1870153 | 12/2007 | |
| EP | 2047905 | 4/2009 | |
| EP | 2955345 | 12/2015 | |
| EP | 3130773 | 2/2017 | |
| EP | 3139009 | 3/2017 | |
| EP | 3239483 | 11/2017 | |
| EP | 3085910 | 8/2018 | |
| EP | 3355056 | 8/2018 | |
| EP | 2998529 | 2/2019 | |
| EP | 3441442 | 2/2019 | |
| EP | 3569988 | 11/2019 | |
| EP | 3878926 | 9/2021 | |
| FR | 2357630 | 2/1978 | |
| FR | 3004722 | 3/2016 | |
| FR | 3027909 | 5/2016 | |
| FR | 3067036 | 12/2018 | |
| FR | 3067037 | 12/2018 | |
| FR | 3072684 | 4/2019 | |
| FR | 3075808 | 6/2019 | |
| GB | 775273 | 5/1957 | |
| GB | 933618 | 8/1963 | |
| GB | 1207719 | 10/1970 | |
| GB | 2144526 | 3/1985 | |
| IN | 202111016535 | 7/2021 | |
| JP | 59220609 | 12/1984 | |
| JP | 2003129067 | 5/2003 | |
| JP | 3160405 | 6/2010 | |
| JP | 2015059220 | 3/2015 | |
| JP | 2019014275 | 1/2019 | |
| KR | 101751923 | 7/2017 | |
| KR | 101823897 | 3/2018 | |
| KR | 20180095303 | 8/2018 | |
| KR | 20190004474 | 1/2019 | |
| KR | 20190004475 | 1/2019 | |
| RU | 2673558 | 11/2018 | |
| RU | 2700705 | 9/2019 | |
| RU | 2760879 | 12/2021 | |
| TW | 320682 | 11/1997 | |
| WO | 199640436 | 12/1996 | |
| WO | 1997033678 | 9/1997 | |
| WO | 199803249 | 1/1998 | |
| WO | 1999041591 | 8/1999 | |
| WO | 2001051588 | 7/2001 | |
| WO | 2006126978 | 11/2006 | |
| WO | 2008088294 | 7/2008 | |
| WO | WO-2010144191 A2 * | 12/2010 | ........... C10G 11/182 |
| WO | 2012026302 | 3/2012 | |
| WO | 2012062924 | 5/2012 | |
| WO | 2012089776 | 7/2012 | |
| WO | 2012108584 | 8/2012 | |
| WO | 2014053431 | 4/2014 | |
| WO | 2014096703 | 6/2014 | |
| WO | 2014096704 | 6/2014 | |
| WO | 2014191004 | 7/2014 | |
| WO | 2014177424 | 11/2014 | |
| WO | 2014202815 | 12/2014 | |
| WO | 2016167708 | 10/2016 | |
| WO | 2017067088 | 4/2017 | |
| WO | 2017207976 | 12/2017 | |
| WO | 2018073018 | 4/2018 | |
| WO | 2018122274 | 7/2018 | |
| WO | 2018148675 | 8/2018 | |
| WO | 2018148681 | 8/2018 | |
| WO | 2018231105 | 12/2018 | |
| WO | 2019053323 | 3/2019 | |
| WO | 2019104243 | 5/2019 | |
| WO | 2019155183 | 8/2019 | |
| WO | 2019178701 | 9/2019 | |
| WO | 2020160004 | 8/2020 | |
| WO | 2021058289 | 4/2021 | |
| WO | 2022133359 | 6/2022 | |

(56) References Cited

FOREIGN PATENT DOCUMENTS

| | | |
|---|---|---|
| WO | 20220144495 | 7/2022 |
| WO | 2022220991 | 10/2022 |

OTHER PUBLICATIONS

Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.
Rodriguez, Elena et al., Coke deposition and product distribution in the co-cracking of waste polyolefin derived streams and vacuum gas oil under FCC unit conditions, Fuel Processing Technology 192 (2019) 130-139.
Passamonti, Francisco J. et al., Recycling of waste plastics into fuels. LDPE conversion in FCC, Applied Catalysis B: Environmental 125 (2012) 499-506.
Andrea De Rezende Pinho et al., Fast pyrolysis oil from pinewood chips co-processing with vacuum gas oil in an FCC unit for second generation fuel production, Fuel 188 (2017) 462-473.
Platvoet et al., Process Burners 101, American Institute of Chemical Engineers, Aug. 2013.
Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems LTD., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al, Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Wasson ECE Instrumentation, LPG Pressurization Station, https://wasson-ece.com/products/small-devices/lpg-pressurization-station.
Mechatest B. V., Gas & Liquefied Gas Sampling Systems, https://www.mechatest.com/products/gas-sampling-system/.
La Rivista dei Combustibili, The Fuel Magazine, vol. 66, File 2, 2012.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
Npra, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.

(56) References Cited

OTHER PUBLICATIONS

Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.

Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.

Meng et al., In bed and downstream hot gas desulphurization during solid fuel gasification: A review, Fuel Processing Technology 91, pp. 964-981, 2010.

Okonkwo et al., Role of Amine Structure on Hydrogen Sulfide Capture from Dilute Gas Streams Using Solid Adsorbents, Energy Fuels, 32, pp. 6926-6933, 2018.

Okonkwo et al., Selective removal of hydrogen sulfide from simulated biogas streams using sterically hindered amine adsorbents, Chemical Engineering Journal 379, pp. 122-349, 2020.

Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.

\* cited by examiner

METHODS AND SYSTEMS FOR ENHANCING PROCESSING OF HYDROCARBONS IN A FLUID CATALYTIC CRACKING UNIT USING A RENEWABLE ADDITIVE

CROSS-REFERENCE TO RELATED APPLICATIONS

This application is a continuation of U.S. Non-Provisional application Ser. No. 18/045,314, filed Oct. 10, 2022, titled "METHODS AND SYSTEMS FOR ENHANCING PROCESSING OF HYDROCARBONS IN A FLUID CATALYTIC CRACKING UNIT USING A RENEWABLE ADDITIVE," which claims priority to and the benefit of U.S. Provisional Application No. 63/262,342, filed Oct. 10, 2021, titled "METHODS AND SYSTEMS FOR ENHANCING PROCESSING OF HYDROCARBONS IN A FLUID CATALYTIC CRACKING UNIT USING A RENEWABLE ADDITIVE," the disclosures of which are incorporated herein by reference in their entirety.

TECHNICAL FIELD

This disclosure relates to systems and methods for enhancing the processing of hydrocarbons in a fluid catalytic cracking (FCC) unit by introduction of a renewable feedstock to the FCC regenerator. The disclosure relates to the addition of certain specific renewable feedstock as an additive to the FCC regenerator, such as biomass-derived pyrolysis oil.

BACKGROUND

FCC units are used in refining operations to produce gasoline and distillate fuels from higher molecular weight hydrocarbons. A catalytic FCC unit has two main components-a reactor and a regenerator. Severe hydroprocessing of FCC feedstock, such as required to meet gasoline sulfur specifications, can result in low FCC regenerator temperatures, low delta coke, and become an obstacle or constraint to unit optimization and refinery profitability. Several process variables can be changed to impact FCC regenerator temperature and formation of delta coke, but, historically the ability to incorporate biomass-derived feedstocks in response to this constraint has been limited. Traditional refinery streams/components that help with low regenerator temperature are almost always higher in sulfur or other contaminants that make processing of biomass-derived feedstocks in FCC unfavorable.

Co-processing of biomass-derived pyrolysis oil in the FCC riser of the FCC reactor cause several challenges. The bio-mass derived pyrolysis oil may cause stability/miscibility issues when the biomass-derived pyrolysis oil is mixed with the FCC feed and may include a potential to coke/plug when mixed at elevated temperatures. Certain studies have shown the development of 'tar balls' in the FCC stripper of the FCC reactor and more deposits in the FCC reactor were noted upon cleaning/inspection. The bio-mass derived pyrolysis oil may cause potential corrosion of stainless steel in the FCC riser of the FCC reactor. In addition to the corrosion concerns, co-processing of pyrolysis oil in a FCC riser results in significant amounts of oxygenates in the FCC hydrocarbon products. Increases in CO and CO2 can also exacerbate a FCC unit wet gas compressor constraint (commonly encountered in FCC units) and reduce unit/refinery profitability. Generation of water pulls hydrogen from going to liquid hydrocarbon products, thus leading to reduced FCC unit and refinery profitability. Oxygenates remaining in hydrocarbon products may also increase corrosion and/or operability concerns. In general, FCC yield/conversion value is proportional to the hydrogen content in FCC feed. The hydrogen content of some pyrolysis oil content is on par with FCC coke (6-8 weight percent (wt %)) and incremental FCC products/yields attributable to this feedstock are very poor.

SUMMARY

Provided here are systems and methods to address these shortcomings of the art and provide other additional or alternative advantages. The disclosure herein provides one or more embodiments of systems and methods for enhancing the processing of hydrocarbons in a FCC unit by introduction of a renewable feedstock to the FCC regenerator. In certain embodiments, the renewable feedstock provided as an additive to the FCC regenerator contains biomass-derived pyrolysis oil. Pyrolysis/bio-oil can be utilized as a FCC feedstock additive and is a low sulfur, low hydrogen content material that despite its traditional characteristics of low miscibility with hydrocarbons and high acidity, it may be used to debottleneck refinery FCC constraints and optimize refinery profitability. Design modifications are provided for new and/or existing FCC regenerators to enhance the throughput of hydrocarbons processed in a FCC unit therefrom, which may be used independently or in various combinations. Such systems and methods, when used in combination, may advantageously provide for consumption of renewable feedstocks in a FCC unit, decrease the energy consumption of a FCC regenerator, and increase FCC unit and refinery profitability.

In certain embodiments, the throughput of hydrocarbons processed in a FCC unit is enhanced by first introducing gas oil and steam into the riser of a FCC unit. The gas oil and steam are mixed with a catalyst that is fluidized in the riser. The gas oil is cracked into one or more FCC products in the presence of the catalyst and the steam, which causes one or more surfaces of the catalyst to be at least partially covered by coke. This coked FCC catalyst is separated from the FCC products in a cyclone of the FCC unit. This cyclone can be positioned in an upper portion of the FCC unit. The coked FCC catalyst from the cyclone of the FCC unit is passed to a regenerator, where oxygen and/or air and a biomass-derived pyrolysis oil are introduced into the regenerator to combust the biomass-derived pyrolysis oil and coke from the coked FCC catalyst. Through such combustion, the biomass-derived pyrolysis oil and coke are oxidized by the oxygen (and/or, in some embodiments, oxygen in supplied air), this leading to regeneration of the catalyst. This regenerated catalyst is returned from the regenerator to the riser of the FCC unit. In certain embodiments, the introduction of the biomass-derived pyrolysis oil allows for an increase of the temperature inside the regenerator by at least about 5 degrees Fahrenheit (° F.) without adversely affecting properties of the FCC products. For example, the sulfur specifications of the FCC products are maintained. The use of the biomass-derived pyrolysis oil can also increase the temperature inside the regenerator while maintaining sulfur specification of gasoline in the FCC products below a pre-selected value. This temperature increase can range from at least about 5° F. to about 25° F. More than 90% of the sulfur content, but generally less than 50% of the total gasoline supply, is contributed by heavier feeds, which are cracked in the FCC. Current maximum gasoline sulfur limits vary widely from 10 ppm to 2,500 ppm depending on the jurisdiction. The sulfur content of the various FCC products can vary from about 0.01 weight percent to about 4.5 weight percent. Certain products, such as ultra-low sulfur diesel, low sulfur vacuum gas oil, and low sulfur heavy fuel oils, have a sulfur content less than about 0.5 weight percent. Certain products, such as GVL slurry and heavy sulfur vacuum gas oil, have a sulfur content from about 1 weight percent to about 2 weight percent. Certain products, such as heavy sulfur heavy fuel oil and asphalt, have a sulfur content from about 3 weight percent to about 4.5 weight percent.

In certain embodiments, the method of processing a gas oil in a FCC unit may include introducing gas oil and steam into a riser of a FCC unit, mixing the gas oil and the steam with catalyst or FCC catalyst that is fluidized in the riser, and cracking the gas oil into one or more FCC hydrocarbon products in the FCC unit. The cracking of the gas oil causes one or more surfaces of the catalyst to be at least partially covered by coke, thus producing or defining a coked FCC catalyst. The method may further include separating the coked FCC catalyst from the one or more FCC hydrocarbon products in a cyclone of the FCC unit, passing the coked FCC catalyst from the cyclone of the FCC unit to a regenerator, introducing at least oxygen and a biomass-derived pyrolysis oil into the regenerator, and combusting the biomass-derived pyrolysis oil and the coke from the coked FCC catalyst in the regenerator. The biomass-derived pyrolysis oil and coke are oxidized by the oxygen and the oxidation and/or combustion provide a regenerated catalyst, which is then returned or supplied from the regenerator to the riser of the FCC unit. The regenerated catalyst may be further mixed with additional gas oil and/or additional steam in the riser of the FCC unit (e.g., the cracking operation beginning again with the regenerated catalyst). In certain embodiments, the biomass-derived pyrolysis oil has an effective hydrogen index of less than 1.5. In certain embodiments, the biomass-derived pyrolysis oil has an effective hydrogen index of less than 1. Introducing the biomass-derived pyrolysis oil into the regenerator can allow the temperature inside the regenerator to be increased without adversely affecting one or more properties of the one or more FCC products. This temperature increase can be at least about 5° F. This temperature increase can be at least about 10° F. This temperature increase can be at least about 15° F. This temperature increase can be at least about 20° F. In certain embodiments, introducing the biomass-derived pyrolysis oil increases the temperature inside the regenerator while maintaining sulfur specifications of the one or more FCC products. This temperature increase can range from at least about 5° F. to about 25° F. In an example, the sulfur level in the FCC product, based on the specification of gasoline (e.g., one of a FCC product), is maintained below a pre-selected value. The biomass-derived pyrolysis oil can be introduced proximate to a bottom portion of the regenerator or the biomass-derived pyrolysis oil can be introduced into a bed of coked FCC catalyst positioned inside the regenerator.

In another embodiment, the method may include determining, based on a signal received by a controller from a temperature sensor positioned within the regenerator, a temperature within the regenerator; and in response to a determination that the temperature within the regenerator is less than a preselected temperature, adjusting, via a flow control device associated with the biomass-derived pyrolysis oil in signal communication with the controller, an amount of the biomass-derived pyrolysis oil introduced into the regenerator to thereby adjust the temperature within the regenerator.

Another embodiment of the disclosure is directed to a method of processing a gas oil in a fluid catalytic cracking (FCC) unit to increase yield selectivities. The method may include introducing the gas oil and steam into a riser of a FCC unit. The method may include mixing the gas oil and the steam with a catalyst fluidized in the riser. The method may include cracking the gas oil into one or more hydrocarbon products in the FCC unit, thereby to cause one or more surfaces of the catalyst to be at least partially covered by coke so as to define a coked catalyst. The method may include separating the coked catalyst and pyoil from the one or more hydrocarbon products in a cyclone positioned in an upper portion of the FCC unit. The method may include introducing a biomass-derived pyrolysis oil into the FCC unit. The biomass-derived pyrolysis oil may comprise one or more of a low miscibility with the gas oil and steam, low hydrogen content, and low sulfur content. The method may include passing the coked catalyst and the biomass-derived pyrolysis oil from the cyclone of the FCC unit to a regenerator. The method may include introducing at least oxygen into the regenerator. The method may include combusting a combination of the biomass-derived pyrolysis oil and the coke from the coked catalyst in the regenerator, thereby to oxidize via the oxygen and produce a regenerated catalyst and a flue gas. The method may include returning the regenerated catalyst from the regenerator to the riser of the FCC unit.

In another embodiment, the low miscibility of pyoil may prevents the pyoil from mixing with the gas oil, steam, and catalyst. In another embodiment, introduction of the biomass-derived pyrolysis oil may comprise introduction of the biomass-derived pyrolysis oil into one or more of a stripping zone of the FCC unit or a stand-pipe configured to connect the FCC unit to the regenerator. The method may also include introducing additional biomass-derived pyrolysis oil into the regenerator. The amount of biomass-derived pyrolysis oil introduced into the FCC unit and the amount of additional biomass-derived pyrolysis oil introduced into the regenerator may be based on one or more of a temperature within the regenerator, a temperature within the riser, or a temperature of the regenerated catalyst. The amount of biomass-derived pyrolysis oil introduced into the riser is about 1% to about 2% wt % of the gas oil.

In another embodiment, the low sulfur content of the biomass-derived pyrolysis oil may cause the hydrocarbon product to remain within a sulfur specification. In another embodiment, the low hydrogen content of the biomass-derived pyrolysis oil may inhibit production of saturated products and increase production of olefinic material.

In another embodiment, the method may include determining, based on a signal received by a controller from a temperature sensor positioned within the regenerator, a temperature within the regenerator; and determining, based on a signal received by a controller from a temperature sensor positioned within the FCC unit, a temperature within the FCC unit. Further, the method may include, in response to one or more determinations that the temperature within the regenerator is less than a first preselected temperature or that the temperature within the FCC unit is less than a second preselected temperature, adjusting, via a flow control device associated with the biomass-derived pyrolysis oil in signal communication with the controller, an amount of the biomass-derived pyrolysis oil introduced into the riser based on the temperature within the regenerator and the temperature within the FCC unit to thereby adjust the temperature within the regenerator and FCC unit (e.g., the riser and/or reactor).

Certain embodiments include systems for processing a gas oil in a fluid catalytic cracking (FCC) unit. One such system may contain a riser having a first inlet to receive a gas oil stream, a second inlet to receive steam, and a third inlet to receive a FCC catalyst. The riser may be configured to be operated under cracking reaction pressure and temperature conditions to facilitate mixing and catalytic cracking of the gas oil stream in presence of the steam and the FCC catalyst to form a plurality of FCC products and coked FCC catalyst. The system further may include a reactor having (i) a FCC reaction zone connected to and in fluid communication with the upper portion of the riser and operated to continue the cracking of the gas oil stream in presence of the steam and the FCC catalyst to form more of the plurality of FCC products and more of the coked FCC catalyst, (ii) a separation zone to separate the plurality of FCC products from the coked FCC catalyst, (iii) a first outlet stream to transport the plurality of FCC products to a fractionation zone to separate the plurality of FCC products into one or more of propylene, isobutene, butylenes, gasoline, distillate, diesel fuel or heating oil, slurry oil and wet gas. The system may further include a regenerator connected to and in fluid communication with a second outlet stream of the reactor and having a fourth inlet stream to receive at least oxygen, a fifth inlet stream to receive biomass-derived pyrolysis oil, a third outlet stream being connected to and in fluid communication with the third inlet of the riser to supply a regenerated FCC catalyst to the riser, and a fourth outlet stream positioned to discharge a flue gas containing one or more of nitrogen, nitrogen oxides, carbon dioxide, carbon monoxide, or water vapor. In an embodiment, the oxygen may be supplied separate from and/or with ambient and/or atmospheric air. This regenerator is operated to oxidize coke on the coked FCC catalyst and the biomass-derived pyrolysis oil thereby to produce the regenerated FCC catalyst and the flue gas. The biomass-derived pyrolysis oil can be introduced proximate to a bottom portion of the regenerator or the biomass-derived pyrolysis oil can be introduced into a bed of the coked FCC catalyst positioned inside the regenerator.

In certain embodiments, the system further includes a stripping zone connected to and in fluid communication with the second outlet stream and the regenerator. The stripping zone is operated to remove adsorbed and entrained hydrocarbons from the coked FCC catalyst prior to supplying the coked FCC catalyst to the regenerator.

In certain embodiments, the oxidation of the biomass-derived pyrolysis oil in the regenerator increases temperature inside the regenerator by at least about 5° F. while maintaining a sulfur level in each of the plurality of FCC products, based on one or more specifications of the plurality of FCC products produced by processing the gas oil, below a pre-selected value. In certain embodiments, the introduction of the biomass-derived pyrolysis oil increases temperature inside the regenerator by at least about 5° F. while maintaining a sulfur level in each of the plurality of FCC products, based on a specification of gasoline in the plurality of FCC products, below a pre-selected value.

In certain embodiments, the biomass-derived pyrolysis oil has an effective hydrogen index of less than 1.5. In certain embodiments, the biomass-derived pyrolysis oil has an effective hydrogen index of less than 1. In certain embodiments, the quantity of biomass-derived pyrolysis oil that is introduced in the FCC regenerator is less than about 2 volume percent of the gas oil introduced into the riser of the FCC unit. In certain embodiments, the quantity of biomass-derived pyrolysis oil that is introduced in the FCC regenerator ranges from about 1 to about 2 volume percent of the gas oil introduced into the riser of the FCC unit.

Another embodiment of the disclosure is directed to a controller to control the processing a gas oil in a fluid catalytic cracking (FCC) unit. The controller may comprise a first set of one or more inputs in signal communication with one or more sensors positioned within one or more of a regenerator, a riser of an FCC unit, and/or a reactor of the FCC unit. The controller may receive signals from the one or more sensors indicative of a characteristic, the characteristic comprising one or more of temperature, pressure, and/or flow rate. The controller may comprise a first set of one or more inputs/outputs in signal communication with one or more flow control devices positioned on one or more inlets or outlets associated with the regenerator, the riser of the FCC unit, and/or the reactor of the FCC unit. The controller may, in response to the characteristic from one of the one or more sensors being less than or greater than a preselected threshold, adjust the one or more flow control devices via a signal indicating a new flow rate for the flow control device to adjust to.

These and other features, aspects, and advantages of the disclosure will be apparent from a reading of the following detailed description together with the accompanying drawings, which are briefly described below. The disclosure includes any combination of one or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

Figure 1:
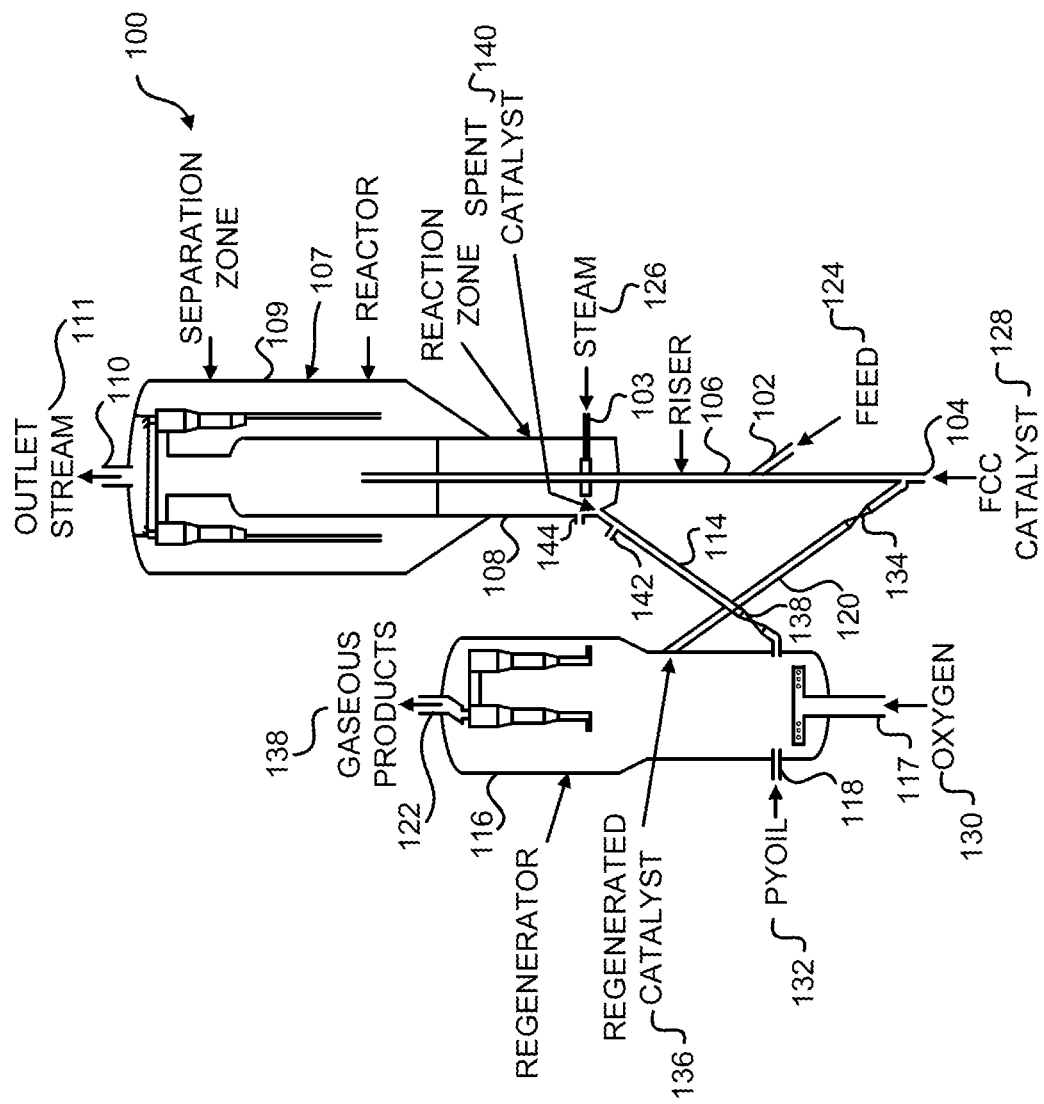

Having thus described the disclosure in general terms, reference will now be made to the accompanying drawings, which are not necessarily drawn to scale, and wherein:

FIG. 1 is a schematic diagram of a FCC unit according to an embodiment of the disclosure.

Figure 2:
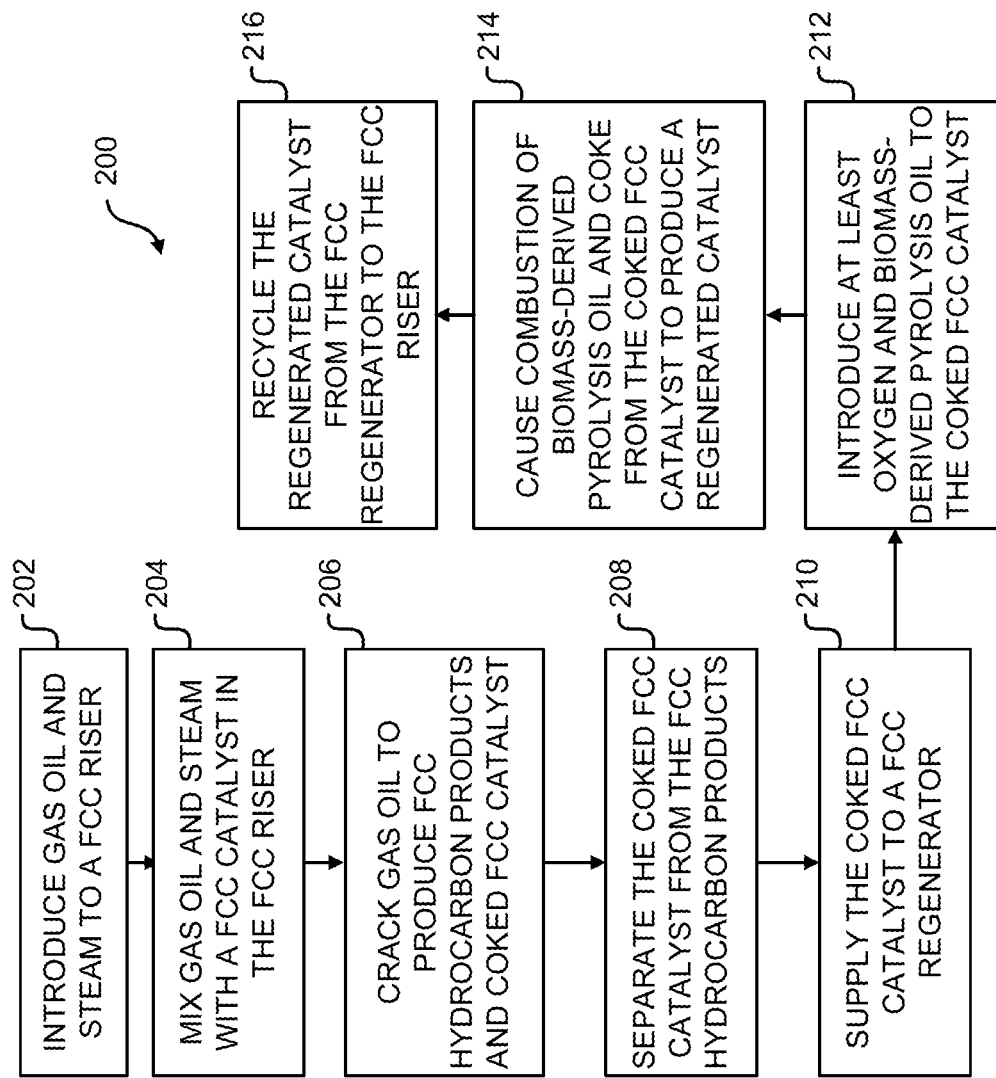

FIG. 2 is a block diagram of a method for processing of hydrocarbons in a FCC unit by introduction of a biomass-derived pyrolysis oil into the regenerator of the FCC reactor, according to an embodiment of the disclosure.

Figure 3:
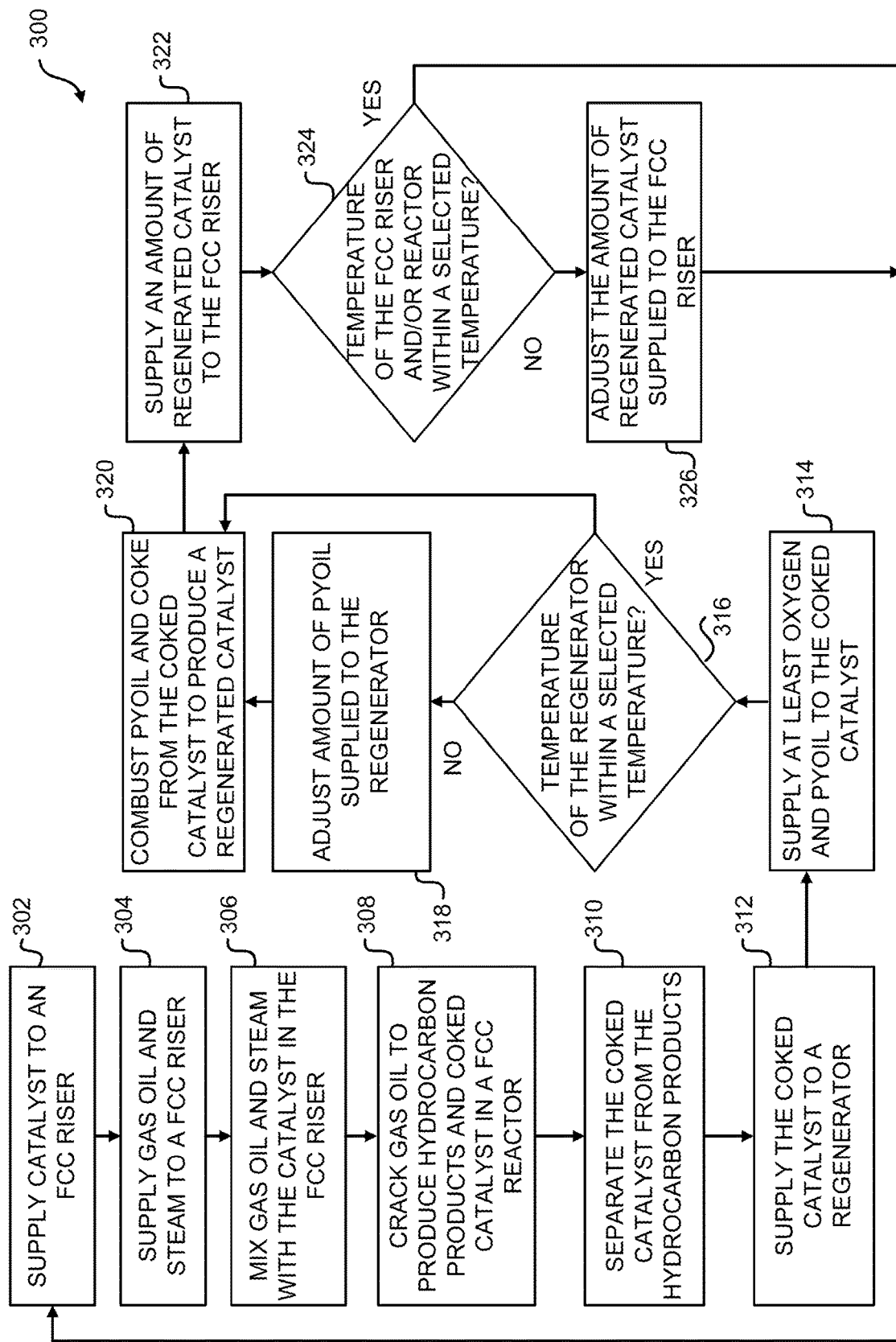

FIG. 3 is another block diagram of a method for processing of hydrocarbons in a FCC unit by introduction of a biomass-derived pyrolysis oil into the regenerator of the FCC reactor, according to an embodiment of the disclosure.

Figure 4:
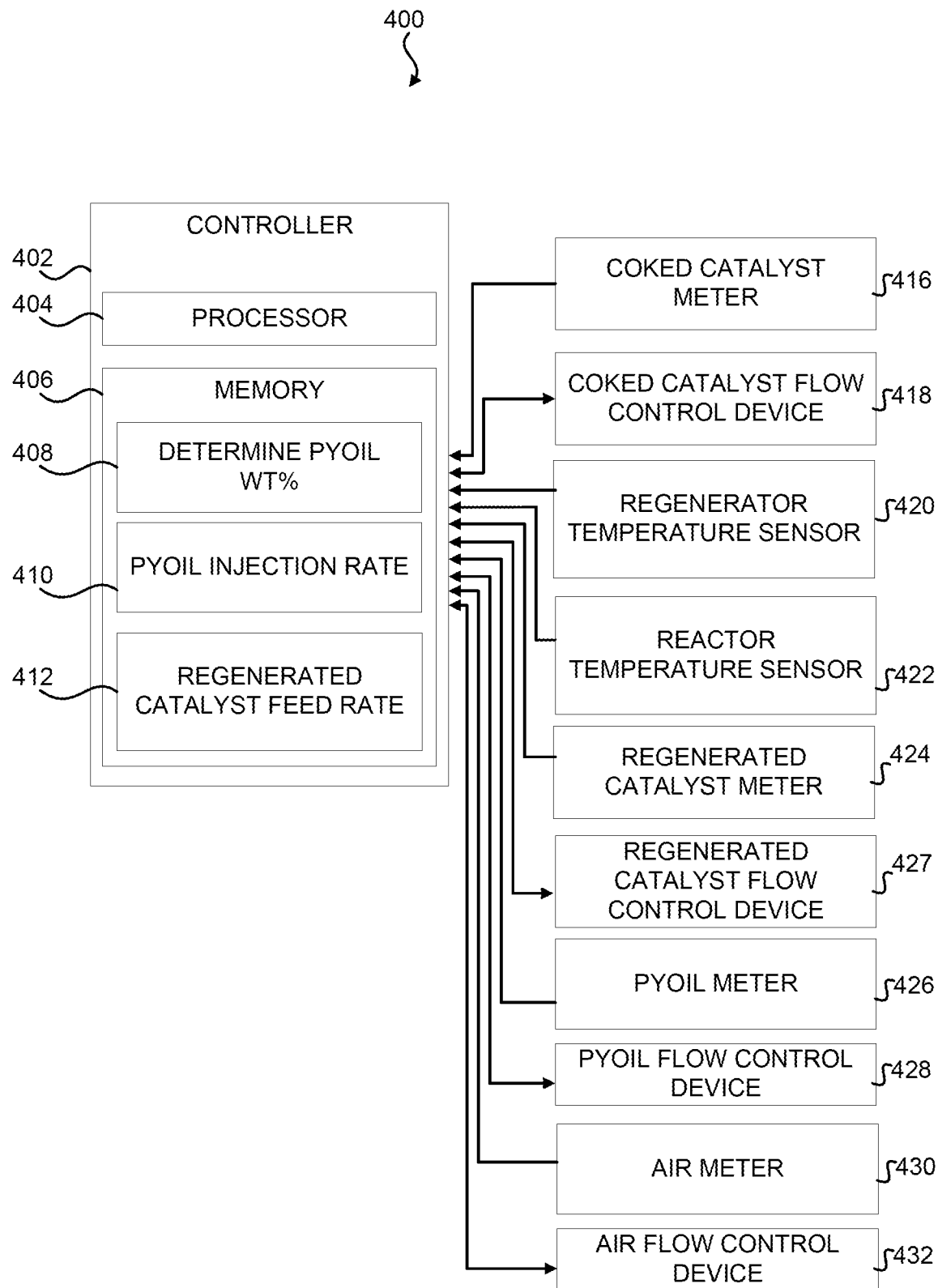

FIG. 4 is a simplified diagram illustrating a control system for managing the processing of hydrocarbons and regeneration of catalyst using biomass-derived pyrolysis oil, according to an embodiment of the disclosure.

Figure 5:
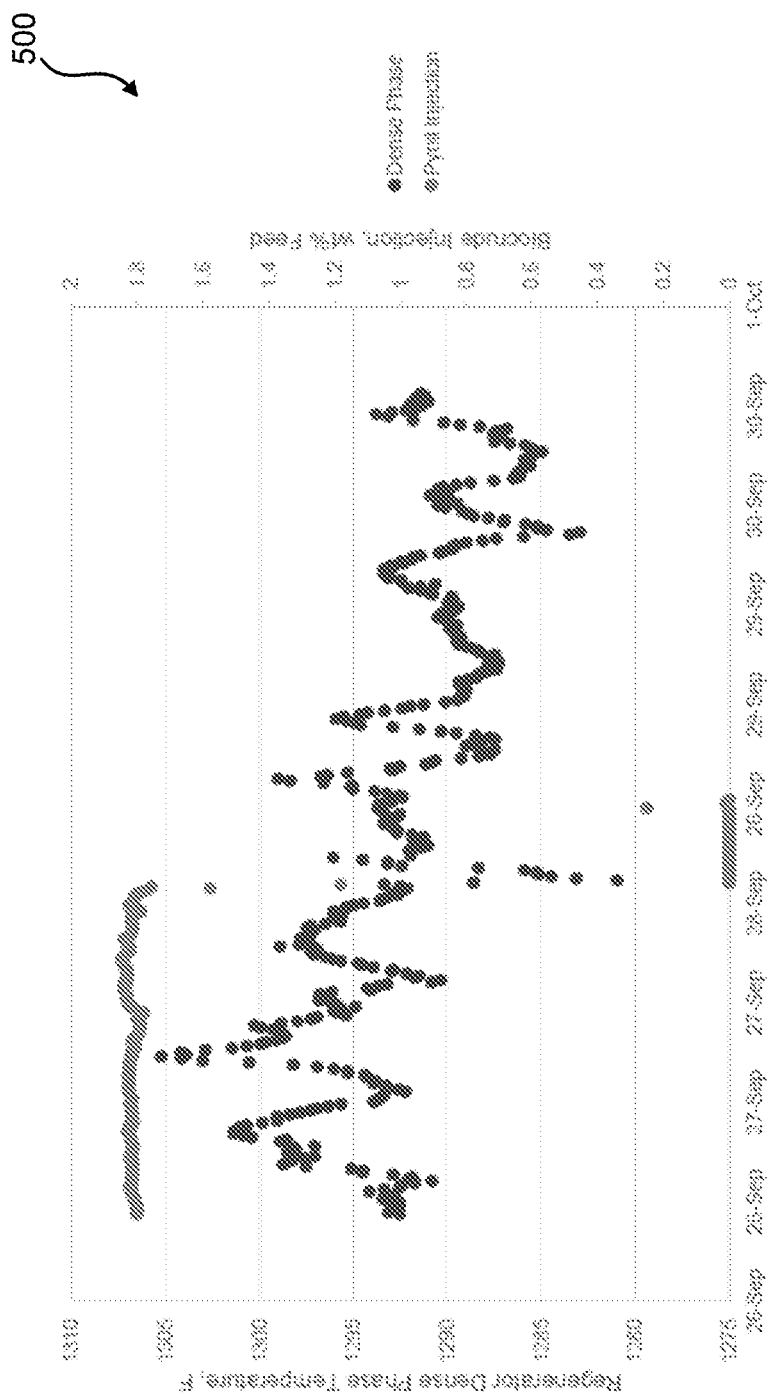

FIG. 5 is a graphical representation of the change in regenerator temperature with and without the introduction of the biomass-derived pyrolysis oil into the regenerator of the FCC reactor.

DETAILED DESCRIPTION

The disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

Biomass includes any renewable source, but does not include oil, natural gas, and/or petroleum. Biomass thus may include wood, paper, crops, animal and plant fats, triglycerides, biological waste, algae, or mixtures of these biological materials. Biomass-derived pyrolysis oil may be a complex mixture of several organic compounds, such as lignin fragments, aldehydes, carboxylic acids, carbohydrates, phenols, furfurals, alcohols, and ketones, derived from Rapid Thermal Processing (RTP) of biomass feedstocks. In some embodiments, the RTP of biomass produces the pyrolysis oil that can be utilized as a FCC feedstock additive to debottleneck refinery.

The FCC units may include "stacked" and "side-by-side" reactors, as well as other configurations. In a stacked reactor, the FCC reactor and the FCC regenerator may be contained in a single vessel with the FCC reactor above the FCC regenerator. The side-by-side reactor includes a separate FCC reactor and FCC regenerator, in other words, a side-by-side reactor may include two separate vessels, often positioned side by side.

In certain embodiments of the FCC unit, a gas oil stream, and steam may be supplied to a riser of a FCC unit. In the riser, the gas oil and steam are brought into contact with the catalyst for catalytic cracking and production of FCC products. The resulting mixture may continue upwardly through an upper portion of the riser. The FCC unit may further include a reactor in communication with the riser for continuing production of FCC products and then separating the FCC products from the coked FCC catalyst. During catalytic cracking, heavy material, known as coke, may be deposited onto the catalyst. The depositing of coke onto the catalyst may reduce catalytic activity of the catalyst. As such, regeneration is desired so the catalyst may be reused. In certain embodiments, the FCC reactor may be equipped with one or more cyclones. Most, substantially all, or a portion of the coked FCC catalyst may be transported to one or more cyclones in the reactor, where the coked FCC catalyst may be separated from the FCC hydrocarbon products. The FCC products may be transported into a fractionation or distillation zone downstream of the FCC reactor. In certain embodiments, the coked FCC catalyst with the adsorbed or entrained hydrocarbons may be passed or transported through a stripping zone. Stripping gas, such as steam, may enter a lower portion of the stripping zone and may rise counter-current to a downward flow of catalyst through the stripping zone, thereby removing adsorbed and entrained hydrocarbons from the coked FCC catalyst which flow upwardly through and are ultimately recovered with the steam by the cyclones. The FCC unit may further include a regenerator in communication with the FCC reactor, either directly or through the stripping zone, and configured to receive a portion of the coked FCC catalyst. After separation of the FCC products from the coked FCC catalyst, regeneration may be accomplished by burning off the coke from the coked FCC catalyst which restores the catalyst activity of the FCC catalyst. The regenerator may be equipped with inlets to supply oxygen and a biomass-derived pyrolysis oil to the coked FCC catalyst. The regenerator may be fed with oxygen and the biomass-derived pyrolysis oil in any ratio to the coked FCC catalyst by changing the flow rate of each into the regenerator. The biomass-derived pyrolysis oil and the coke in the coked FCC catalyst are oxidized by oxygen to produce the regenerated catalyst. In an embodiment, the biomass-derived pyrolysis oil may be injected into the reactor. Further, biomass-derived pyrolysis oil may be injected into a stand-pipe configured to connect the reactor to the regenerator and/or into a stripping zone of the reactor.

In an embodiment, the oxygen may be provided or supplied separate from and/or with ambient and/or atmospheric air. Ambient and/or atmospheric air may include varying amounts of nitrogen, oxygen, and/or other gases (e.g., argon, carbon dioxide, water vapor, and/or other small or trace amounts of other gases), as will be understood by one skilled in the art. Further, the ambient and/or atmospheric air may include about 78% nitrogen, about 21% oxygen, and about 1% of other gases (e.g., about 0.9% argon, about 0.05% carbon dioxide, and other small or trace amounts of gases including, but not limited to, water vapor, neon, helium, methane, and/or krypton, as will be understood by one skilled in the art). As noted, oxygen may be supplied to the regenerator (e.g., about 100% oxygen). In an embodiment, additional oxygen may be mixed with air (e.g., ambient and/or atmospheric air) in varying amounts and supplied to the regenerator. For example, the mixture of oxygen and air may include or comprise about 70% nitrogen, about 29% oxygen, and/or other gases; about 60% nitrogen, about 39% oxygen, and/or other gases; about 50% nitrogen, about 49% oxygen, and/or other gases; about 40% nitrogen, about 59% oxygen, and/or other gases; about 30% nitrogen, about 69% oxygen, and/or other gases; 20% nitrogen, about 79%, and/or other gases; about 20% nitrogen, about 79%, and/or other gases; about 10% nitrogen, about 89% oxygen, and/or other gases; about 99% oxygen and/or other gases (e.g., a mixture comprised of about 1% total of nitrogen, argon, carbon dioxide, water vapor, and/or other gases, as will be understood by one skilled in the art); and/or other varying percentages of nitrogen, oxygen, and/or other gases. In another embodiment, the additional oxygen may be supplied to the regenerator separate from the air (e.g., via another injection point or location). In an embodiment, the amount of air and/or oxygen injected or supplied to the regenerator may be controlled by a controller and/or flow control devices. The amount of air and/or oxygen (in addition to or rather than adjustment of biomass-derived pyrolysis oil injected into or supplied to the regenerator and/or reactor) may be varied based on the temperature within the regenerator (e.g., the temperature which may indicate the amount of coke on the coked catalyst that is combusted).

The regenerator may be operated at temperatures in the range of about 1000° F. to 1600° F., of about 1000° F. to about 1500° F., of about 1100° F. to about 1450° F., at about 1250° F. to about 1400° F., or about 1300° F. to achieve adequate combustion while keeping catalyst temperature below those temperatures at which significant catalyst degradation can occur and/or above a temperature such that cracking in the reactor may be efficient. In one or more other embodiments, the temperature in the regenerator may not exceed greater than or may be held at about 1450° F., about 1400° F., about 1350° F., about 1300° F., about 1250° F., about 1200° F., about 1150° F., about 1100° F., about 1050° F., and/or about 1000° F. The temperature at which significant catalyst degradation may occur may be based on a number of variables, such as the temperature and/or water content within the FCC unit (such characteristics may be monitored via one or more sensors and/or probes), among other factors. This processing of the biomass-derived pyrolysis oil in the regenerator alleviates FCC processing constraints and optimizes refinery profitability. The biomass-derived pyrolysis oil, when utilized as a FCC feedstock additive, may be injected in low concentrations into the regenerator of the FCC unit. While crackability of this FCC feedstock additive may be poor (high levels of coke precursors/aromatics), which results in lower FCC conversion, the impact on heat balance is significant.

The tendency of a biomass-derived pyrolysis oil to cause coking of a catalyst is measured by the effective hydrogen index (EHI), also called 'hydrogen to carbon effective ratio' in the literature (Chen et al., 1988).

$$EHI=(H-2O-3N-2S)/C$$

where H, O, N, S and C are the atoms per unit weight of the sample of hydrogen, oxygen, nitrogen, sulfur, and carbon, respectively.

In certain embodiments, the biomass-derived pyrolysis oil may have an effective hydrogen index of less than 1.5. In other embodiments, the biomass-derived pyrolysis oil may have an effective hydrogen index of less than 1. This FCC feedstock additive's low hydrogen content may also change or affect overall FCC yield selectivities. The FCC feedstock additive may be a net hydrogen receptor inside the FCC unit (lower hydrogen content than fresh feed). Depending on the incremental yields attributed to this FCC feedstock additive, additional economic value (e.g., renewable identification numbers, low carbon fuel standard credits, etc.) may be applicable. Utilizing this renewable FCC feedstock additive can sustainably debottleneck FCC operation/constraints and optimize refinery profitability.

Introduction of the biomass-derived pyrolysis oil directly into the regenerator in a FCC unit can benefit from additional delta coke. The yields related to biomass-derived pyrolysis oil introduced into the FCC reactor are relatively poor, such that processing or cracking this biomass-derived pyrolysis oil can result in negative yields of transportation fuels. As previously discussed, there are several challenges related to processing this biomass-derived pyrolysis oil on the reactor side of the FCC unit. Therefore, this selection of introduction of the biomass-derived pyrolysis oil to the regenerator or the FCC unit (e.g., the stripping zone of the reactor and/or a stand-pipe connecting the reactor to the regenerator) overcomes these challenges, and yields improvements, such as debottlenecking production constraints, further optimization of energy consumption, and reduced coke yield on fresh feed.

FIG. 1 a schematic diagram of a non-limiting, FCC system 100 according to one or more embodiments of the disclosure. A gas oil or feed stream 124 and steam 126 may be supplied to a riser 106 of a FCC system 100 via an inlet, conduit, pipe, or pipeline (e.g., conduit 102 and conduit 103, respectively). Appropriate FCC catalysts 128 may be supplied via a catalyst stream via an inlet, conduit, pipe, or pipeline (e.g., conduit 104), as will be understood by one skilled in the art. In the riser 106, the gas oil or feed stream 124 and steam 126 may be brought into contact with the FCC catalyst 128 or catalyst stream for catalytic cracking and production of FCC products. The injection location for the gas oil or feed stream 124 and steam 126 may be located anywhere in the riser/reactor and may be altered dependent upon the characteristics of the gas oil and the temperature of the FCC catalyst 128. In certain embodiments, the gas oil or feed stream 124 can contain one or more of other feeds, such as biomass, pyrolysis oil, conventional FCC feed streams, and decant oil. The riser 106 may be operated under cracking reaction pressure and temperature conditions (e.g., the pressure and/or temperature based on various factors, such as the type of gas oil, among other factors, as will be understood by one skilled in the art) to facilitate mixing and catalytic cracking of the gas oil stream in presence of the steam and the FCC catalyst to form a plurality of FCC products and coked FCC catalyst. The reaction temperature, feed stream rates, feed residence time, gas oil/steam FCC feed concentrations, and FCC catalyst loadings may be modified to obtain maximum fuel range products. The resulting mixture continues upwardly to the FCC reactor 107 through an upper portion of the riser 106. The FCC reactor 107 may contain a FCC reaction zone 108 connected to and in fluid communication with the upper portion of the riser 106 and operated to continue the cracking of the gas oil stream in presence of the steam and the FCC catalyst to form more of the plurality of FCC products and more of the coked FCC catalyst. The FCC reactor 107 may contain a separation zone 109 to separate the plurality of FCC products from the coked FCC catalyst. In certain embodiments, the separation zone 109 may contain one or more cyclones to separate the coked FCC catalyst from the plurality of FCC products. The FCC reactor 107 may also contain an outlet 110 to transport the plurality of FCC products from the separation zone 109 to a fractionation zone to separate the plurality of FCC products into one or more of propylene, isobutene, butylenes, gasoline, distillate, diesel fuel or heating oil, slurry oil and wet gas.

In certain embodiments, the coked FCC catalyst 128 with the adsorbed or entrained hydrocarbons may be passed into a stripping zone. Stripping gas, such as steam, may enter or may be injected into a lower portion of the stripping zone. The stripping gas may rise counter-current to a downward flow of catalyst through the stripping zone, thereby removing adsorbed and entrained hydrocarbons from the coked FCC catalyst which flows upwardly through and are ultimately recovered with the steam by the cyclones. In an embodiment, biomass-derived pyrolysis oil may be injected into the stripping zone at inlet or conduit 144. Such an inlet or conduit 144 may be dedicated to injection of the biomass-derived pyrolysis oil. The FCC system 100 may further include a regenerator 116 in fluid communication with the FCC reactor 107 (e.g., via a conduit, pipe, inlet/outlet, stand-pipe, or pipeline, such as conduit 114), either directly or through the stripping zone, and configured to receive a portion of the coked FCC catalyst via a spent catalyst stream 140 (e.g., via conduit 114). A valve 138 (e.g., such as a slide valve or control valve) may be positioned on the conduit 114 to control the amount of the coked FCC catalyst flowing to the regenerator 116. In an embodiment, an inlet 142 may be positioned on the conduit 114 to allow for injection of biomass-derived pyrolysis oil. After separation of the FCC products from the coked FCC catalyst, regeneration may be accomplished by burning off the coke from the coked FCC catalyst, which restores the catalyst activity of the FCC catalyst. The regenerator 116 may be equipped with an inlet 117 to supply at least oxygen 130 (e.g., the oxygen being supplied as oxygen and/or with ambient and/or atmospheric air) and a pyoil inlet 118 to supply biomass-derived pyrolysis oil (e.g., pyoil 132) to the coked FCC catalyst. The regenerator 116 may be fed with oxygen 130 (and/or, in some embodiments, air) and the biomass-derived pyrolysis oil in any ratio to the coked FCC catalyst by changing the flow rate of oxygen (and/or, in some embodiments, air) supplied via the inlet 117 and the biomass-derived pyrolysis oil 132 supplied via the pyoil inlet 118 into the regenerator 116. The biomass-derived pyrolysis oil 132 and the coke in the coked FCC catalyst may be oxidized by the oxygen (and/or, in some embodiments, the oxygen in the air) to produce the regenerated catalyst. Such a reaction may be exothermic as a large amount of heat is released from the oxidation. The gaseous products of coke oxidation, which may be referred to as flue gas, may exit the regenerator 116 via the exit stream 122. The balance of the heat may cause the regenerator to produce the regenerated catalyst. The regenerated catalyst, in addition to providing a catalytic function, may act as a vehicle for the transfer of heat from the regenerator 116 to the FCC riser 106. The regenerated catalyst may be transported from the regenerator 116 via a catalyst outlet stream to the FCC riser 106 (e.g., via a conduit 120). A valve 134 may be positioned on the conduit 120 to control the amount of the regenerated catalyst flowing to the riser 106. In an embodiment, the regenerated catalyst from the catalyst outlet stream 120 may be supplied to the riser 106 of a FCC system 100 via the catalyst stream 104.

In certain embodiments, the regenerator 116 of an existing FCC unit may be adapted or retro-fitted to add an element to allow for the introduction of the renewable feedstock or biomass-derived pyrolysis oil to the regenerator. For example, this element can be an installed independent and/or dedicated conduit, pipe, or pipeline for introducing the biomass-derived pyrolysis oil (e.g., for example, conduit 118). In another embodiment, conduit 118 may be a torch oil inlet. Prior to or upon initiation of a cracking operation, the torch oil inlet may be configured to allow gas oil, feed, and/or biomass-derived pyrolysis oil to flow therethrough to the regenerator to heat the regenerator. In another embodiment, conduit 118 may include a nozzle configured for injection of biomass-derived pyrolysis oil with or without steam.

The flow through this element (e.g., conduit 118) can be initiated, modified, or stopped by an independent control system or by a control system (e.g., such as a controller) for the regenerator or the FCC unit. Various control designs and/or schemes may also be suitable for use in introduction of the renewable feedstock to the regenerator of an existing FCC unit. Various configurations and arrangements of FCC reactor and the regenerator, including the positioning of various sections and/or components therein, may vary as will be understood by a person skilled in the art.

In another embodiment, the FCC system 100 may include a controller or control system (e.g., such as controller 402 in FIG. 4) and various sensors, probes, and/or control valves (e.g., valve 134 and/or valve 138) positioned throughout the FCC system 100 and in signal communication with the controller or control system. The controller or control system may receive and send information, data, and/or instructions to and from, respectively, the various sensors, probes, and/or control valves. In such examples, the controller or control system may receive some characteristic regarding one or more different parts of the FCC system 100 from the sensors or probes (e.g., temperature within the regenerator 116, riser 106, and/or reactor 107) and, based on those characteristics and one or more preselected thresholds (e.g., a preselected temperature range within the regenerator 116, riser 106, and/or reactor 107), adjust flow and/or amount of one or more materials or fluids flowing into or supplied to the regenerator 116 and/or riser 106 (e.g., gas oil, pyoil, fresh catalyst, regenerated catalyst, oxygen, air, and/or steam).

FIG. 2 is a block diagram of a method 200 for enhancing the processing of hydrocarbons in a FCC unit by introduction of a biomass-derived pyrolysis oil into the regenerator of the FCC unit. In an embodiment, the actions of method 200 may be completed within a control system (e.g., such as controller 402). Specifically, method 200 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 202, an amount of gas oil and steam may be introduced to into a riser of a FCC unit. The gas oil can be one or more of the following feeds: atmospheric and vacuum gas oil, light and heavy coker gas oil, hydrocracked residue, atmospheric residue, or deasphalted oil. The hydrocarbons in the gas oil feed includes paraffins and cycloparaffins, aromatic hydrocarbons with a different number of aromatic rings, and resins and asphaltenes. At block 204, the gas oil and the steam are mixed with a FCC catalyst that is fluidized in the riser, and at block 206, the gas oil is subject to catalytic cracking of the higher molecular weight hydrocarbons into one or more FCC products. The cracking of the gas oil causes one or more surfaces of the catalyst to be at least partially covered by coke, thus producing a coked FCC catalyst. At block 208 the coked FCC catalyst is separated from the one or more FCC products in a cyclone of the FCC unit and at block 210 of passing the coked FCC catalyst from the cyclone of the FCC unit to a regenerator. Further, at block 212, oxygen (and/or, in some embodiments, air) and a biomass-derived pyrolysis oil are introduced into the regenerator and mixed with the coked FCC catalyst, and at block 214, the biomass-derived pyrolysis oil and coke from the coked FCC catalyst undergo combustion in the regenerator. The biomass-derived pyrolysis oil and coke are oxidized by the oxygen (and/or, in some embodiments, the oxygen in the air) to provide a regenerated catalyst, which is then returned at block 216 from the regenerator to the riser of the FCC unit. In certain embodiments, the biomass-derived pyrolysis oil has an effective hydrogen index of less than 1.5. In certain embodiments, the biomass-derived pyrolysis oil has an effective hydrogen index of less than 1. Introducing the biomass-derived pyrolysis oil into the regenerator can allow the temperature inside the regenerator to be increased without adversely affecting one or more properties of the one or more FCC products. This temperature increase can range from at least about 5° F. to about 25° F. In certain embodiments, introducing the biomass-derived pyrolysis oil increases the temperature inside the regenerator while maintaining sulfur specifications of the one or more FCC products. For example, the sulfur level in a specification of gasoline, a FCC product, is maintained below a pre-selected value. More than 90% of the sulfur content, but generally less than 50% of the total gasoline supply, is contributed by heavier feeds, which are cracked in the FCC. Current maximum gasoline sulfur limits vary widely from 10 ppm to 2,500 ppm depending on the jurisdiction. The sulfur content of the various FCC products can vary from about 0.01 weight percent to about 4.5 weight percent. Certain products, such as ultra-low sulfur diesel, low sulfur vacuum gas oil, and low sulfur heavy fuel oils, have a sulfur content less than about 0.5 weight percent. Certain products, such as GVL slurry and heavy sulfur vacuum gas oil, have a sulfur content from about 1 weight percent to about 2 weight percent. Certain products, such as heavy sulfur heavy fuel oil and asphalt, have a sulfur content from about 3 weight percent to about 4.5 weight percent. The biomass-derived pyrolysis oil can be introduced proximate to a bottom portion of the regenerator or the biomass-derived pyrolysis oil can be introduced into a bed of coked FCC catalyst positioned inside the regenerator.

In certain embodiments, the quantity of biomass-derived pyrolysis oil that is introduced in the FCC regenerator is less than about 2 volume percent of the gas oil introduced into the riser of the FCC unit. In certain embodiments, the quantity of biomass-derived pyrolysis oil that is introduced in the FCC regenerator ranges from about 1 to 2 volume percent of the gas oil introduced into the riser of the FCC unit.

FIG. 3 is a block diagram of a method 300 for enhancing the processing of hydrocarbons in a FCC unit by introduction of a biomass-derived pyrolysis oil into the regenerator of the FCC unit. In an embodiment, the actions of method 300 may be completed within a control system (e.g., such as controller 402). Specifically, method 300 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 302, during a cracking operation or upon an initiation of a cracking operation, an amount of catalyst may be supplied to a riser or FCC riser of a FCC unit. The catalyst (also referred to as a FCC catalyst) may be comprised of a zeolite and/or other components (e.g., a matrix, binder, filler, etc.), as will be understood by one skilled in the art. As catalyst within the FCC unit is utilized in a cracking operation, the catalyst may attract coke or become coked (e.g., coke accumulates on the catalyst). The coked or spent catalyst may be transferred from the FCC unit and regenerated catalyst may be supplied the riser of the FCC unit. In an embodiment, the amount of regenerated catalyst supplied to the FCC unit may be adjusted based on the current amount of catalyst within the FCC unit. In such examples, a control system (e.g., controller 402) may determine the current amount of catalyst in the FCC unit based on the amount of coked catalyst transferred to a regenerator, the amount of fresh catalyst supplied to the FCC unit (e.g., which may be a small amount or a small amount in relation to the regenerated catalyst), the amount of regenerated catalyst supplied to the FCC unit, and/or the composition of hydrocarbon products produced by the FCC unit. In another example, the control system (e.g., controller 402) may determine the current amount of catalyst in the FCC unit based on a signal indicating such an amount from a sensor.

At block 304, a gas oil and steam may be supplied to the riser of the FCC unit. In an embodiment, the gas oil may be preheated prior to introduction or being supplied to the riser of the FCC unit. The temperature within the FCC unit (e.g., based on the temperature of the steam, gas oil, and/or catalyst), or the riser and/or reactor of the FCC unit, may be within the range of about 650° F. to about 1050° F., or even higher, to perform a cracking operation based on the type of gas oil supplied to the FCC unit as will be understood by one skilled in the art. Further, heat from regenerated catalyst may be utilized to increase temperature, as described herein and with further detail below, such as the temperature of the riser, reactor, and/or regenerator.

At block 306, the gas oil and steam may mix with the catalyst in the riser of the FCC unit. At block 308, the gas oil may be cracked (e.g., higher molecular weight hydrocarbons are converted or cracked to smaller vaporous molecule). Such a cracking operation may cause coke or carbonaceous material to form on the surface of the catalyst thereby forming a coked catalyst. Forming of the coke on the catalyst may reduce the catalytic capability of the catalyst, thus, to utilize the catalyst in further operations or again, the coked catalyst may be passed through a regenerator.

At block 310, the coked catalyst may be separated from the hydrocarbon or gas products formed via the cracking operation. Such separation may occur via one or more cyclones included in the reactor of the FCC unit. At block 312, the coked catalyst may flow to or be supplied or pumped to the regenerator via a pipe, pipeline, or conduit. The amount and/or rate of coked catalyst flowing to the regenerator may be controlled via a flow control device positioned on the pipe, pipeline, or conduit. At block 314 oxygen (e.g., oxygen and/or ambient and/or atmospheric air) and pyoil (e.g., biomass derived pyrolysis oil) may be supplied to the regenerator (e.g., mixed with the coked catalyst). The oxygen (e.g., oxygen and/or ambient and/or atmospheric air) may be utilized to aid in combustion of the coke deposited on the coked catalyst. Further, if the oxygen is supplied as air, additional oxygen may be supplied with the air. As the operation of regeneration is an exothermic reaction, the temperature within the reactor may increase (e.g., during combustion). Such an operation (e.g., regeneration and cracking) may be a continuous or substantially continuous process. As such, at block 316, the temperature of the regenerator may be determined. In such examples, a temperature sensor may be disposed within the regenerator and utilized to provide an indication of the temperature within the regenerator. The temperature within the regenerator may vary based on the heat from the coked catalyst and the amount of pyoil injected into the regenerator, among other factors. Further, combustion of the pyoil and coke deposited on the coked catalyst may generate flue gas. The flue gas may comprise one or more of nitrogen, nitrogen oxides, carbon dioxide, carbon monoxide, or water vapor. The flue gas may be discharged from the regenerator at an outlet positioned proximate a top or upper portion of the regenerator.

If the temperature within the regenerator is not within a selected temperature, then, at block 318, the amount of pyoil injected into or supplied to the regenerator may be adjusted. For example, if the regenerator is below a selected temperature, then the amount of pyoil injected into the regenerator may be increased, while if the temperature is above the selected temperature, then the amount of pyoil injected into the regenerator may be decreased. After adjustment of the amount of pyoil or if the temperature is within the selected temperature, then, at block 320, the pyoil and coke may be combusted to form a regenerated catalyst. In another embodiment, and as noted, combustion may be continuous. Thus, in such an embodiment, the adjustment of the amount of pyoil injected into the regenerator and combustion of the pyoil and coke may occur in parallel or substantially simultaneously. The amount of pyoil injected into the regenerator may be controlled via a flow control device positioned along an inlet of the regenerator, the inlet configured to allow pyoil to enter the regenerator.

At block 322 an amount of regenerated catalyst may be supplied to the riser of the FCC unit. In an embodiment, the regenerated catalyst may be stored or supplied to a well or stand-pipe, prior to transfer or reintroduction to the riser of the FCC unit. The regenerate catalyst, at this point may be at high temperature that is lower than a temperature at which the catalyst may degrade. The temperature of the regenerated catalyst may be about range of about 1000° F. to 1600° F., of about 1000° F. to about 1500° F., of about 1100° F. to about 1450° F., at about 1250° F. to about 1400° F., or about 1300° F. In one or more other embodiments, the temperature of the catalyst may not exceed greater than about 1450° F., about 1400° F., about 1350° F., about 1300° F., about 1250° F., about 1200° F., about 1150° F., about 1100° F., about 1050° F., and/or about 1000° F. The regenerated catalyst may maintain such a temperature within the well or standpipe for a period of time prior to reintroduction or transfer to the riser of the FCC unit. The supplied amount of regenerated catalyst may mix or be mixed with one or more of fresh catalyst, additional or new gas oil, and/or steam. In such embodiments, the cracking operation may continue with the supplied regenerated catalyst. Further, the cracking operation may be a continuous or substantially continuous operation, with such adjustments described herein occurring as the cracking operation is executed.

At block 324, the temperature of or within the riser of the FCC unit and/or of or within the reactor of the FCC unit may be determined (e.g., via a temperature sensor or probe). If the temperatures of the riser and/or reactor are not within a selected temperature, then, at block 326, the amount of regenerated catalyst supplied to the riser and/or the amount of pyoil supplied to the regenerator may be adjusted. In another embodiment, the temperature of or within other portions or locations of the FCC unit may be determined and adjustment of the amount of regenerated catalyst supplied to the riser and/or the amount of pyoil supplied to the regenerator may be performed based on that temperature.

In an embodiment, an amount of fresh catalyst may be supplied (or such a supply may be adjusted) to the riser. The amount of fresh catalyst supplied to the riser may be a small amount in relation to the amount of regenerated catalyst supplied to the riser. In other words, small amounts of fresh catalyst may be supplied to the riser from time to time.

For example, if the FCC unit is operating at slightly below optimal conditions (e.g., the temperature is too cool within the riser and/or reactor), then, rather than or in addition to increasing preheating of the gas oil or increasing the temperature of the steam (or, in other embodiments, being heated via another external heat source), an additional amount of regenerated catalyst, at a higher temperature, may be mixed with the gas oil. Further, the amount of pyoil used in the regenerator may be increased to thereby increase the temperature of the regenerated catalyst. Thus, the overall temperature within the riser and/or reactor may be increased using a renewable resource (e.g., the pyoil) and the overall efficiency of the FCC unit may be increased (e.g., operating at a higher temperature without increasing heating from any other source).

In another embodiment, rather than or in addition to, injection of the pyoil into the regenerator, the pyoil may be included in or injected into a stripping zone of the reactor and/or via a stand-pipe connecting the reactor to the regenerator (e.g., at about 1% to about 2% wt % of pyoil in relation to the gas oil). In such embodiments, the amount of pyoil may be varied based on the same factors described above (e.g., temperature within the regenerator, temperature within riser and/or reactor, and/or temperature of the regenerated catalyst), among other factors. While the pyoil may include high levels of coke precursors and/or aromatics, the use of pyoil, as noted, may increase the temperature within the reactor and increase overall yield of the FCC unit. Further, the pyoil may include low or substantially none of sulfur, thus adding the pyoil, for example, into a stripping zone of the reactor and/or via a stand-pipe connecting the reactor to the regenerator may not impact hydrocarbon or gas product specifications (e.g., particularly specifications with low sulfur). Further, the pyoil may be low in hydrogen, thereby preventing or inhibiting production of saturated products and favoring production of olefinic material.

Further still, the pyoil may include low miscibility with the gas oil and steam. As the pyoil is introduced to the, for example, stripping zone, the pyoil may remain unmixed with the other materials (gas oil, steam, and/or catalyst). In such embodiments, substantially all of the pyoil may flow to the regenerator. The pyoil may then be combusted in the regenerator along with the coke from the coked catalyst and increase the temperature in reactor. In yet another embodiment, additional pyoil may be injected directly into the regenerator to further increase the temperature within the regenerator.

In another embodiment, the method 300 may include determining, based on a signal received by a controller from a temperature sensor positioned within the regenerator, a temperature within the regenerator. Further, the temperature within the FCC unit may be determined, based on a signal received by a controller from a temperature sensor positioned within the FCC unit, a temperature within the FCC unit. Further still, in response to one or more determinations that the temperature within the regenerator is less than a first preselected temperature or that the temperature within the FCC unit is less than a second preselected temperature, a flow control device associated with the biomass-derived pyrolysis oil in signal communication with the controller may be adjusted, via the controller, such that an amount of the biomass-derived pyrolysis oil introduced into the riser may be adjusted based on (1) the temperature within the regenerator and/or (2) the temperature within the FCC unit to thereby adjust the temperature within the regenerator and riser.

FIG. 4 is a simplified diagram illustrating a control system 400 for managing the processing of hydrocarbons and regeneration of catalyst using biomass-derived pyrolysis oil (also referred to as pyoil), according to one or more embodiments disclosed herein. In an example, the control system may include a controller 402 or one or more controllers. Further, the controller 402 may be in signal communication with various other controllers throughout or external to a refinery. The controller 402 may be considered a supervisory controller. In another example, a supervisory controller may include the functionality of controller 402.

Each controller 402 described above and herein may include a machine-readable storage medium (e.g., memory 406) and one or more processors (e.g., processor 404). As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory 406 may store or include instructions executable by the processor 404. As used herein, a "processor" may include, for example one processor or multiple processors included in a single device or distributed across multiple computing devices. The processor 404 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

In an embodiment, the controller 402 may obtain the temperature at various points and/or locations or of materials in the system 400 or FCC unit. For example, a reactor temperature sensor 422 or probe may provide, in real-time and/or continuously or at regular intervals, a signal to the controller 402 indicative of the temperature within the reactor and/or indicative of temperature of the materials within the reactor. In another example, a regenerator temperature sensor 420 or probe may provide, in real-time and/or continuously or at regular intervals, a signal to the controller 402 indicative of the temperature within the regenerator and/or indicative of temperature of the materials within the reactor. Other temperatures sensors and/or probes may be positioned at varying locations throughout the system, e.g., including, but not limited to, at each inlet of the reactor, riser, and/or regenerator; at each outlet of the reactor, riser, and/or regenerator; and/or within a well or stand-pipe configured to store regenerated catalyst. Other sensors may be disposed throughout the system 400 to measure or indicate various other aspects or characteristic within the system, e.g., such as a coked catalyst meter 416 (e.g., to indicate a flow rate and/or amount of coked catalyst flowing from the riser or reactor), a regenerated catalyst meter 424 (e.g., to indicate a flow rate and/or amount of regenerated catalyst flowing to the riser and/or a well or stand pipe), a pyoil meter 426 (e.g., to indicate a flow rate and/or amount of pyoil flowing to the riser and/or regenerator), and/or an air (and/or separate and/or additional oxygen) meter 430 (e.g., to indicate a flow rate and/or amount of air (and/or separate and/or additional oxygen) flowing to the regenerator). Other sensors or probes may measure or indicate pressure and/or other characteristics.

In an example, the sensors or probes positioned and/or disposed throughout the system 400 may be pressure transducers, flow meters, mass flow meters, Coriolis meters, other measurement sensors to determine a density, flow, temperature, or other variable as will be understood by those skilled in the art, or some combination thereof. In such examples, the sensors may measure the density of a fluid or material, the flow of the fluid or material, the temperature of the fluid or material, and/or the pressure within various locations of the system (e.g., within the reactor, riser, and/or regenerator). As noted above, the controller 402 may be in signal communication with the sensors, probes, or meters. The controller 402 may poll or request data from the sensors at various points or substantially continuously during a cracking and/or regeneration operation.

In an embodiment, the system 400 may include one or more different flow control devices. For example, the system 400 may include a coked catalyst flow control device 418, a regenerated catalyst flow control device 427, a pyoil flow control device 428, an air (and/or separate and/or additional oxygen) flow control device 432, and/or other flow control devices to control an amount of material or fluid flowing from one location to another. Each flow control device may include one or more of a pump, a meter (as described herein), a sensor or probe (as described herein), a valve (e.g., a control valve, a slide valve, or another valve configured to control an amount of fluid or material flowing therethrough), and/or some combination thereof. In such examples, each component of the flow control device may be in signal communication with the controller 402. The flow control devices may allow for adjustment of the flow of the fluid or material based on various factors received by the controller 402.

The controller 402, according to an embodiment, may include instructions 408 to determine a wt % of pyoil in relation to coked catalyst, gas oil or feed, or another material or fluid in the system. In such embodiments, the controller 402 may determine such a value based on a number of factors. For example, if the controller 402 is determining wt % of pyoil in relation to gas oil or feed flowing into a riser, then the controller 402 may determine such a value based on the amount of gas oil or feed flowing into the riser and the amount of the pyoil injected into the regenerator, stripping zone, and/or a stand-pipe, along with the amount of gas oil or feed. In another example, if the controller 402 is determining wt % of pyoil in relation to coked catalyst flowing into the regenerator (e.g., when pyoil is injected into directly into the regenerator), then the controller 402 may determine such a value based on the amount of coked catalyst flowing into the regenerator and the amount of the pyoil injected into the regenerator.

The controller 402, in another embodiment, may include instructions 410 to adjust the pyoil injection rate. In an embodiment, to maximize efficiency and reduce cost, the controller 402 may introduce an amount of pyoil to increase the temperature within the regenerator. Initially, the amount of pyoil may be greater than 0% to about 2% wt % in relation to feed or coked catalyst (based on where the pyoil is injected). After such an initial amount is injected and during cracking operations, the amount of pyoil may be adjusted to between about 0% to about 2% wt % as noted. The controller 402 may determine whether to increase or decrease the amount of pyoil based on the temperature within the reactor, the current wt % of the pyoil, the pyoil flow rate, the flow rate of the coked catalyst flowing into the regenerator, the temperature of the coked catalyst, and/or the temperature within the regenerator, among other factors. For example, the controller 402 may, in response to the temperature within the regenerator and/or temperature of the regenerated catalyst being less than a selected temperature, increase the amount of pyoil directly injected into the regenerator. Such an increase may occur based on the controller 402 sending a signal indicating an increase in amount of pyoil to a pyoil flow control device 428. In yet another example, the controller 402 may decrease the amount of pyoil injected into the regenerator or riser if the temperature of the reactor is above a selected temperature. In an embodiment, the controller 402, in addition to adjusting or determining an adjustment to pyoil injection rate, may determine an amount of and/or injection rate of oxygen and/or air. For example, based on the temperature within the regenerator, the controller 402 may adjust an amount of oxygen to inject directly into the regenerator, an amount of additional oxygen to mix with air supplied to the regenerator, and/or adjust the flow rate of air and/or oxygen supplied to the regenerator.

The controller 402 may additionally include instructions 412 to determine a rate and/or amount of regenerated catalyst to supply to a riser of an FCC unit to mix with additional and/or new gas oil and/or steam. In an embodiment, the regenerator of a FCC unit may regenerate catalyst, as described herein. In other words, the regenerator may enable coked or spent catalyst to perform further catalytic functions based on combustion of the coke deposited on the coked or spent catalyst. Prior to the regenerated catalyst being reintroduced into or supplied to the riser, the controller 402 may determine the temperature within the riser and/or the reactor, the temperature within the regenerator, the temperature of the regenerated catalyst, the temperature of fresh catalyst, the temperature of the gas oil or feed, and/or the amount of regenerated catalyst in a well or stand-pipe, among other factors. Based on these factors the amount of regenerated catalyst being mixed in the riser may be varied. For example, if the temperature within the reactor and/or riser (or, in other embodiments, various other locations within a FCC unit) is less than a preselected temperature, then the controller may increase the amount of regenerated catalyst flowing to the riser. As the amount of regenerated catalyst is increased, the temperature within the riser may increase, thus the gas oil or feed and the steam may not utilize additional pre-heating thereby saving energy, reducing cost, and/or reducing emissions.

Such an increase or decrease of the flow of regenerated catalyst may be controlled via the regenerated catalyst flow control device 427. The controller 402 may send signals indicating adjustment of flow rate of the regenerated catalyst to the regenerated catalyst flow control device 427.

In another embodiment, the controller 402 may control flow rates of other materials or fluids, such as the amount of air (and/or separate and/or additional oxygen) introduced into the regenerator (e.g., via the air (and/or separate and/or additional oxygen) flow control device 432), the amount of coked catalyst flowing into the regenerator (e.g., via the coked catalyst flow control device 418), the amount of pyoil flowing into the regenerator or riser (e.g., via the pyoil flow control device 428), and/or the amount of gas oil or feed flowing into the riser. Other factors, as noted, may be utilized in adjusting such flow rates, such as pressure, density, and/or temperature, among other factors (e.g., for example, capacity of the reactor, riser, and/or well or stand-pipe).

In another embodiment, the controller 402 may comprise or include a first set of one or more inputs in signal communication with one or more sensors (e.g., the coked catalyst meter 416, the regenerator temperature sensor 420, the reactor temperature sensor 422, the catalyst meter 424, the regenerated catalyst meter 425, the pyoil meter 426, the air (and/or separate and/or additional oxygen) meter 430, and/or a riser temperature sensor). The one or more sensors may be positioned within or proximate to one or more of a regenerator, a riser of an FCC unit, a reactor of the FCC unit, and/or other conduits or pipe and/or inlets and/or outlets associated with the regenerator, the riser of the FCC unit, and/or the reactor of the FCC unit. The controller 402 may receive signals from the one or more sensors indicative of a characteristic. The characteristic may comprise one or more of temperature, pressure, and/or flow rate. The controller 402 may comprise a first set of one or more inputs/outputs in signal communication with one or more flow control devices (e.g., the coked catalyst flow control device 418, the regenerated catalyst flow control device 427, the pyoil flow control device 428, and/or the air (and/or separate and/or additional oxygen) flow control device 432) positioned on one or more inlets or outlets associated with the regenerator, the riser of the FCC unit, and/or the reactor of the FCC unit. The controller 402 may, in response to the characteristic from one of the one or more sensors being less than or greater than a preselected threshold (e.g., a temperature, pressure, or flow rate range), adjust the one or more flow control devices via a signal indicating a new flow rate for the flow control device to adjust to.

FIG. 5 is a graphical representation 500 of the change in regenerator temperature with and without the introduction of the biomass-derived pyrolysis oil into the regenerator of the FCC reactor. Regenerator temperatures are increased without impacting FCC product specifications such as gasoline sulfur. This temperature increase can range from at least about 2° F. to about 25° F.

Certain embodiments relate to a method of decreasing energy consumption by a FCC unit in a refinery operation by introduction of a biomass-derived pyrolysis oil into the regenerator of the FCC unit. In certain embodiments, the method includes increasing temperature in a regenerator unit of an FCC unit by introduction of a biomass-derived pyrolysis oil into the regenerator of the FCC unit in an amount ranging from one and two volume percent of the gas oil introduced into the riser of the FCC unit. In certain embodiments, the method includes increasing temperature in a regenerator unit of an FCC unit by introduction of a biomass-derived pyrolysis oil into the regenerator of the FCC unit in an amount less than two volume percent of the gas oil introduced into the riser of the FCC unit. Certain embodiments relate to a method of increasing delta coke by a FCC unit in a refinery operation by introduction of a biomass-derived pyrolysis oil into the regenerator of the FCC unit. Delta coke is the difference between the coke on coked FCC catalyst leaving the stripper and the coke on regenerated catalyst (CRC) leaving the regenerator, which is expressed in weight percent of the catalyst.

Specific compositions, methods, or systems are intended to be only illustrative of the embodiments disclosed by this specification. Variation on these systems, methods, or embodiments are readily apparent to a person of skill in the art based upon the teachings of this specification and are therefore intended to be included as part of the inventions disclosed herein.

This application is a continuation of U.S. Non-Provisional application Ser. No. 18/045,314, filed Oct. 10, 2022, titled "METHODS AND SYSTEMS FOR ENHANCING PROCESSING OF HYDROCARBONS IN A FLUID CATALYTIC CRACKING UNIT USING A RENEWABLE ADDITIVE," which claims priority to and the benefit of U.S. Provisional Application No. 63/262,342, filed Oct. 10, 2021, titled "METHODS AND SYSTEMS FOR ENHANCING PROCESSING OF HYDROCARBONS IN A FLUID CATALYTIC CRACKING UNIT USING A RENEWABLE ADDITIVE," the disclosures of which are incorporated herein by reference in their entirety.

The above detailed description is given for explanatory or illustrative purposes. It will be apparent to those skilled in the art that numerous changes and modifications can be made without departing from the scope of the inventive aspects of the technology. Accordingly, the whole of the foregoing description is to be construed in an illustrative and not a limitative sense, the scope of the invention being defined solely by the appended claims.

The invention claimed is:

1. A system for processing a gas oil in a fluid catalytic cracking (FCC) unit, the system comprising:
   a reactor having (i) a reactor inlet, (ii) an FCC reaction zone operable to crack a gas oil stream received via the reactor inlet in presence of steam and an FCC catalyst, thereby to form a plurality of FCC products and coked FCC catalyst when in operation, (iii) a separation zone to separate the plurality of FCC products from the coked FCC catalyst, (iii) a first outlet to remove the plurality of FCC products from the reactor, and (iv) a second outlet;
   a regenerator in fluid communication with the second outlet of the reactor, the regenerator having a first regenerator inlet to receive at least oxygen, a second regenerator inlet in fluid communication with a biomass-derived pyrolysis oil, a first regenerator outlet in fluid communication with the reactor to supply a regenerated FCC catalyst to the reactor, and a second regenerator outlet positioned to discharge a flue gas from the regenerator, the regenerator being operable to oxidize coke on the coked FCC catalyst and the biomass-derived pyrolysis oil, thereby to produce the regenerated FCC catalyst and the flue gas; and a controller configured to adjust an amount of the biomass-derived pyrolysis oil supplied to the regenerator based on an indication of a temperature within the system, thereby to maintain sufficient temperatures within the system to crack the gas oil stream in the FCC reaction zone and to oxidize the coke in the regenerator.

2. The system of claim 1, further comprising a temperature sensor positioned to measure a temperature within the regenerator or the reactor, wherein the controller is in signal communication with the temperature sensor and is configured to receive the indication of the temperature within the system from the temperature sensor.

3. The system of claim 1, wherein the controller is configured to, in response to a determination that the temperature within the regenerator is below a selected value, increase the amount of the biomass-derived pyrolysis oil supplied to the regenerator, thereby to increase the temperature within the regenerator to oxidize the coke on the coked FCC catalyst.

4. The system of claim 3, wherein the controller is configured to adjust the amount of biomass-derived pyrolysis oil supplied to the regenerator via a flow control device connected to the second regenerator inlet.

5. The system of claim 1, wherein the controller is configured to, in response to a determination that the temperature within the regenerator is above a selected value, decrease the amount of the biomass-derived pyrolysis oil supplied to the regenerator, thereby to reduce the temperature within the regenerator to restrict degradation of the FCC catalyst.

6. The system of claim 1, further comprising a stripping zone in fluid communication with the regenerator, the stripping zone being operated to remove adsorbed and entrained hydrocarbons from the coked FCC catalyst prior to supplying the coked FCC catalyst to the regenerator.

7. The system of claim 1, wherein the system is configured to introduce the biomass-derived pyrolysis oil proximate a bottom portion of the regenerator.

8. The system of claim 1, wherein the system is configured to introduce the biomass-derived pyrolysis oil into a bed of the coked FCC catalyst positioned within the regenerator.

9. The system of claim 1, wherein the system is configured to introduce the biomass-derived pyrolysis oil in an amount less than about 2 volume percent of the gas oil stream introduced into the reactor.

10. A method of processing a gas oil in a fluid catalytic cracking (FCC) system, the method comprising:
mixing the gas oil and steam with an FCC catalyst;
cracking the gas oil into one or more FCC hydrocarbon products in a reactor of the FCC system, thereby to cause one or more surfaces of the FCC catalyst to be at least partially covered by coke so as to define a coked FCC catalyst;
separating the coked FCC catalyst from the one or more FCC hydrocarbon products in a cyclone within the reactor;
supplying the coked FCC catalyst from the cyclone to a regenerator of the FCC system;
supplying a biomass-derived pyrolysis oil into the regenerator;
combusting a combination of the biomass-derived pyrolysis oil and the coke on the coked FCC catalyst in the regenerator, thereby to produce a regenerated FCC catalyst and a flue gas;
supplying the regenerated FCC catalyst to the reactor; and
adjusting an amount of the biomass-derived pyrolysis oil supplied to the regenerator based on a temperature within the FCC system, thereby to maintain sufficient temperatures within the FCC system to crack the gas oil in the reactor and to combust the coke in the regenerator.

11. The method of claim 10, wherein adjusting the amount of the biomass-derived pyrolysis oil comprises increasing the amount of the biomass-derived pyrolysis oil supplied to the regenerator in response to a determination that the temperature within the regenerator is below a selected value, thereby to increase the temperature within the regenerator to combust the coke.

12. The method of claim 11, wherein adjusting the amount of the biomass-derived pyrolysis oil comprises decreasing the amount of the biomass-derived pyrolysis oil supplied to the regenerator in response to a determination that the temperature within the regenerator is above a selected value, thereby to decrease the temperature within the regenerator to restrict degradation of the FCC catalyst.

13. The method of claim 12, further comprising receiving an indication of the temperature within the regenerator from a temperature sensor connected to the FCC system.

14. The method of claim 10, wherein the biomass-derived pyrolysis oil is introduced proximate a bottom portion of the regenerator.

15. The method of claim 10, wherein the biomass-derived pyrolysis oil is introduced into a bed of catalyst positioned within the regenerator.

16. The method of claim 10, wherein the biomass-derived pyrolysis oil has an effective hydrogen index of less than 1.5.

17. The method of claim 10, further comprising introducing the gas oil to the reactor prior to mixing, and wherein the biomass-derived pyrolysis oil is introduced in an amount less than about 2 volume percent of the gas oil introduced into the reactor.

18. A method of processing a gas oil in a fluid catalytic cracking (FCC) system, the method comprising:
cracking the gas oil into one or more hydrocarbon products in the presence of a catalyst in a reactor of the FCC system, thereby to cause one or more surfaces of the catalyst to be at least partially covered by coke so as to define a coked catalyst;
separating the coked catalyst from the one or more hydrocarbon products;
introducing a biomass-derived pyrolysis oil into one or more of: (a) a stripping zone of the reactor, or (b) a pipe that connects the reactor to a regenerator so as to supply the biomass-derived pyrolysis oil to the regenerator;
supplying the coked catalyst and the biomass-derived pyrolysis oil to the regenerator;
combusting the biomass-derived pyrolysis oil and the coke on the coked catalyst in the regenerator, thereby to produce a regenerated catalyst and a flue gas;
returning the regenerated catalyst to the reactor; and
adjusting an amount of the biomass-derived pyrolysis oil supplied to the regenerator based on a temperature within the FCC system, thereby to maintain sufficient temperatures within the FCC system to crack the gas oil in the reactor and to combust the coke in the regenerator.

19. The method of claim 18, wherein adjusting the amount of the biomass-derived pyrolysis oil comprises increasing the amount of the biomass-derived pyrolysis oil supplied to the regenerator in response to a determination that the temperature within the regenerator is below a selected value, thereby to increase the temperature within the regenerator to combust the coke.

20. The method of claim 18, wherein adjusting the amount of the biomass-derived pyrolysis oil comprises decreasing the amount of the biomass-derived pyrolysis oil supplied to the regenerator in response to a determination that the temperature within the regenerator is above a selected value, thereby to decrease the temperature within the regenerator to restrict degradation of the catalyst.

21. The method of claim 18, further comprising introducing additional biomass-derived pyrolysis oil into the regenerator.

22. The method of claim 21, wherein the additional biomass-derived pyrolysis oil is introduced proximate a bottom portion of the regenerator.

23. The method of claim 21, wherein the biomass-derived pyrolysis oil and the additional biomass-derived pyrolysis oil has an effective hydrogen index of less than 1.5.

24. A method of processing a gas oil, the method comprising:
    cracking the gas oil into one or more hydrocarbon products in the presence of a catalyst in a reactor, thereby to cause one or more surfaces of the catalyst to be at least partially covered by coke so as to define a coked catalyst;
    separating the coked catalyst from the one or more hydrocarbon products;
    supplying a biomass-derived pyrolysis oil and the coked catalyst to a regenerator;
    combusting the biomass-derived pyrolysis oil and coke from the coked catalyst in the regenerator, thereby to produce a regenerated catalyst and a flue gas; and
    adjusting an amount of the biomass-derived pyrolysis oil supplied to the regenerator based on a temperature within the regenerator or the reactor, thereby to maintain sufficient temperatures within the reactor to crack the gas oil and within the regenerator to combust the coke.

25. The method of claim 24, wherein adjusting the amount of the biomass-derived pyrolysis oil comprises increasing the amount of the biomass-derived pyrolysis oil supplied to the regenerator in response to a determination that the temperature within the regenerator is below a selected value, thereby to increase the temperature within the regenerator to combust the coke.

26. The method of claim 25, wherein adjusting the amount of the biomass-derived pyrolysis oil comprises decreasing the amount of the biomass-derived pyrolysis oil supplied to the regenerator in response to a determination that the temperature within the regenerator is above a selected value, thereby to decrease the temperature within the regenerator to restrict degradation of the catalyst.

27. The method of claim 26, further comprising receiving an indication of the temperature within the regenerator from a temperature sensor connected to the regenerator.

28. The method of claim 26, wherein the biomass-derived pyrolysis oil has an effective hydrogen index of less than 1.5.

29. The method of claim 26, further comprising introducing the gas oil to the reactor prior to the cracking, and wherein the biomass-derived pyrolysis oil is introduced in an amount less than about 2 volume percent of the gas oil introduced into the reactor.

* * * * *